(12) United States Patent
Misonou

(10) Patent No.: US 6,955,026 B2
(45) Date of Patent: Oct. 18, 2005

(54) LIGHT-TRANSMITTING GLASS PANEL

(75) Inventor: Masao Misonou, Nishinomiya (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 10/982,146

(22) Filed: Nov. 5, 2004

(65) Prior Publication Data

US 2005/0138892 A1    Jun. 30, 2005

Related U.S. Application Data

(63) Continuation of application No. PCT/JP03/05667, filed on May 6, 2003.

(30) Foreign Application Priority Data

May 7, 2002 (JP) .............................. 2002-131982

(51) Int. Cl.⁷ .............................................. E04C 2/54
(52) U.S. Cl. ................. 52/786.13; 52/788.1; 52/171.3; 428/34
(58) Field of Search ........................ 52/786.13, 171.3, 52/204.62, 788.1; 428/34

(56) References Cited

U.S. PATENT DOCUMENTS 6,105,336 A    8/2000    Katoh et al.

6,210,763 B1    4/2001    Katoh et al.

FOREIGN PATENT DOCUMENTS

| EP | 0 860 406 A1 | 8/1998 |
| EP | 0 963 961 A1 | 12/1999 |
| WO | WO 93/15296 A1 | 8/1993 |

*Primary Examiner*—Naoko Slack
(74) *Attorney, Agent, or Firm*—Frishauf, Holtz, Goodman & Chick, P.C.

(57) ABSTRACT

The light-transmitting glass panel 1 is comprised of a pair of glass plates 11 and 12 that are hermetically joined together with one surface of each thereof facing one another, the joining being via a sealing frame 13 that is provided at an outer peripheral portion of the glass plates 11 and 12 and fluidizes at low temperature, and the glass plates 11 and 12 having a hollow layer 14 formed therebetween, and pillars 15 that are substantially cylindrical spacers that are inserted into the hollow layer 14 as atmospheric pressure supporting members and determine the gap between the glass plate 11 and the glass plate 12. The pillars 15 are arranged in the hollow layer 14 in a matrix shape with a predetermined spacing, and taking the surface residual compressive stress of the glass plates 11 and 12 in MPa to be S, and the thickness of the glass plates 11 and 12 in mm to be d, the average spacing D in mm of the pillars 15 arranged in the hollow layer 14 satisfies the relationship $D \leq 5.2d+5.5+(0.8d+0.08)\cdot\sqrt{S}$.

37 Claims, 5 Drawing Sheets

LIGHT-TRANSMITTING GLASS PANEL

This application is a continuation application of International Application PCT/JP03/05667 filed May 6, 2003.

TECHNICAL FIELD

The present invention relates to a light-transmitting glass panel, and in particular to a light-transmitting glass panel that can be used in opening means in the field of buildings such as residential buildings and non-residential buildings, the field of transport such as automobiles and other vehicles, ships and aircraft, the field of equipment such as freezers, freezer display cases and high-temperature high-humidity baths, and so on, and furthermore to a light-transmitting glass panel having incorporated therein a low-pressure multi-layered glass having high thermal insulation ability that can be applied to opening means for which energy saving is required.

BACKGROUND ART

In recent years, so as to keep down consumer energy demand and thus keep down emissions of $CO_2$ gas which is feared to have an adverse effect on the global environment, the frequency of use of opening means such as windows having a higher thermal insulation performance and better energy saving than conventionally has increased, and such opening means have rapidly become widespread.

Furthermore, opening means having a thermal insulation performance comparable to that of walls and floors, specifically a thermal conductance of approximately 0.6 $W/m^2K$ (0.5 $kcal/m^2$ hr° C.) or less, have gradually come to be demanded. The requirement of the thermal conductance of an opening means being not more than 0.6 $W/m^2K$ cannot be satisfied with hitherto widespread multi-layered glass panels in which dry air is filled between two glass plates, and hence research into opening means having novel structures is being carried out with vigor. With multi-layered glass panels, it is already commonplace to fill with a noble gas such as argon or krypton having a lower thermal conductivity than dry air instead of dry air, or use low-emission (low-E) glass in which a low-emission layer having a low-emission function of reflecting infrared radiation has been applied onto a surface of the glass plate that contacts the dry air, thus reducing the part of heat transmission due to radiation; however, opening means having a thermal conductance of not more than 0.6 $W/m^2K$ have not yet been realized.

One can thus envisage a multi-layered glass panel in which there are three or more glass plates and two or more layers filled with gas, and hence high thermal insulation performance is realized. With such an opening means, one assumes that a noble gas would be used as the gas, and low-E glass would be used for the glass plates; the thickness of the opening means would be high, and hence installation into a window frame or the like would be complicated, and moreover the weight would be high, and furthermore even slight optical absorption by the glass would be multiplied and hence the transmittivity would be reduced and thus the inherent light-transmitting ability would no longer be sufficiently displayed.

A thermally insulating vacuum glass panel in which a hollow layer formed between mutually facing glass plates is made to be at low pressure has been proposed as a multi-layered glass panel. However, atmospheric pressure always acts on the surface of each glass plate on the opposite side to the hollow layer side, and hence to counteract this and stably maintain the hollow layer, spacers must be disposed in the hollow layer. However, heat will flow through the spacers, and hence the excellent thermal insulation performance obtained through the low pressure will be marred by the presence of the spacers.

In addition to such a thermally insulating vacuum glass panel, other thermally insulating vacuum glass panels, and thermally insulating glass panels having a novel construction in which ordinary glass plates are disposed with a gap therebetween and the hollow layer thus formed is filled with dry air or a noble gas having a low thermal conductivity such as argon or krypton have also been proposed.

However, even with a combination of a conventional thermally insulating vacuum glass panel, a noble gas, and low-E glass, it has not been possible to realize a glass panel having a thermal conductance of not more than 0.6 $W/m^2K$.

Thermally insulating vacuum glass panels enabling easy provision of light-transmitting opening means having high thermal insulation performance with a thermal conductance of approximately 0.6 $W/m^2K$ or less are awaited, and it is necessary to once again take a fresh look at the design of thermally insulating vacuum glass panels, and thoroughly eliminate heat transmission pathways.

The amount of conduction of heat through spacers depends on the density of arrangement of the spacers per unit area of the opening means, i.e. the spacing (pitch) of the spacers, the average area of contact with the glass plates per spacer, the thermal conductivity of the spacers, and the thermal conductivity of the glass plates. If the spacing of the spacers per unit area of the opening means is wide, and the average area of contact with the glass plates per spacer is small, then the thermal conductivity will be low and hence the thermal insulation ability of the opening means will be improved, but an excessive tensile stress may be produced at the surface of each glass plate on the atmosphere side opposite the surface of contact with the spacers, leading to natural breakage of the glass plate, and hence careful studies must be carried out (it goes without saying that the tensile stress produced is related not only to the average density of arrangement of the spacers but also to the Young's modulus of the glass plate and the thickness of the glass plate). Furthermore, compressive stress acts on the spacers due to atmospheric pressure, and hence it is necessary to make the spacers have sufficient compressive strength. A procedure for carrying out these studies is disclosed in Published Japanese Translation of PCT Application (Kohyo) No. H07-508967.

In Published Japanese Translation of PCT Application (Kohyo) No. H07-508967, the design is carried out under the assumption that ordinary annealed glass is used, and thus that there is no surface residual compressive stress. If the design procedure of Published Japanese Translation of PCT Application (Kohyo) No. H07-508967 is followed, then with glass plates of thickness 3 mm, 22 mm is the lower limit for the average spacing of the spacers, and at below this value, the probability of self destruction occurring from immediately above the contact surface of a glass plate with a spacer can no longer be ignored.

It is an object of the present invention to provide a light-transmitting glass panel having high thermal insulation performance with thermal conductance sufficiently reduced.

DISCLOSURE OF THE INVENTION

To attain the above object, according to the present invention, there is provided a light-transmitting glass panel comprising a pair of glass plates provided separated from one another by a predetermined gap so as to form a hollow layer therebetween, and an outer periphery sealing portion that is provided at a peripheral portion of the pair of glass plates and hermetically seals in the hollow layer, characterized in that the light-transmitting glass panel has a low-emission layer that is provided on an inner surface of at least one of the pair of glass plates and has an emittance of not more than 0.1, and pillars that are sandwiched between the pair of glass plates in a matrix shape and arranged at a predetermined pitch so as to maintain the predetermined gap, and that the hollow layer has a pressure therein of not more than 10 Pa, and a thickness d in mm of the pair of glass plates, a surface residual compressive stress S in MPa of the pair of glass plates, and the predetermined pitch D of the pillars satisfy $D \leq f(d, \sqrt{S})$.

According to this construction, a light-transmitting glass panel having high thermal insulation performance with a thermal conductance of not more than 0.6 W/m²K can be provided.

Preferably, $f(d, \sqrt{S})$ is defined as $f(d, \sqrt{S})=5.2\,d+5.5+(0.8\,d+0.08)\cdot\sqrt{S}$. As a result, the above effect can be achieved reliably.

Also preferably, the thickness d of the pair of glass plates is in a range of 2 to 8 mm, and the surface residual compressive stress S of the pair of glass plates is in a range of 1 to 200 MPa.

Also preferably, the thickness d of the pair of glass plates is in a range of 2.5 to 6 mm, and the predetermined pitch of the pillars is not less than 15 mm.

Also preferably, the pair of glass plates have a Young's modulus in a range of 70 to 75 GPa.

Also preferably, the light-transmitting glass panel further has a second glass plate provided separated from one of the pair of glass plates by a second predetermined gap so as to form a second hollow layer, a spacer that is hermetically sandwiched between the one of the pair of glass plates and the second glass plate so as to maintain the second predetermined gap, and a second low-emission layer that is provided on at least one of a second inner surface of the one of the pair of glass plates and an inner surface of the second glass plate and has an emittance of not more than 0.2, wherein the second hollow layer is filled with a predetermined gas.

As a result, the thermal conductance of the light-transmitting glass panel can easily be made to be not more than 0.6 W/m²K.

More preferably, the predetermined gas is dry air.

Alternatively, more preferably, the predetermined gas is a noble gas.

Yet more preferably, the noble gas is argon.

Alternatively, yet more preferably, the noble gas is krypton.

BEST MODE FOR CARRYING OUT THE INVENTION

Embodiments of the present invention will now be described with reference to the drawings.

Figure 1:
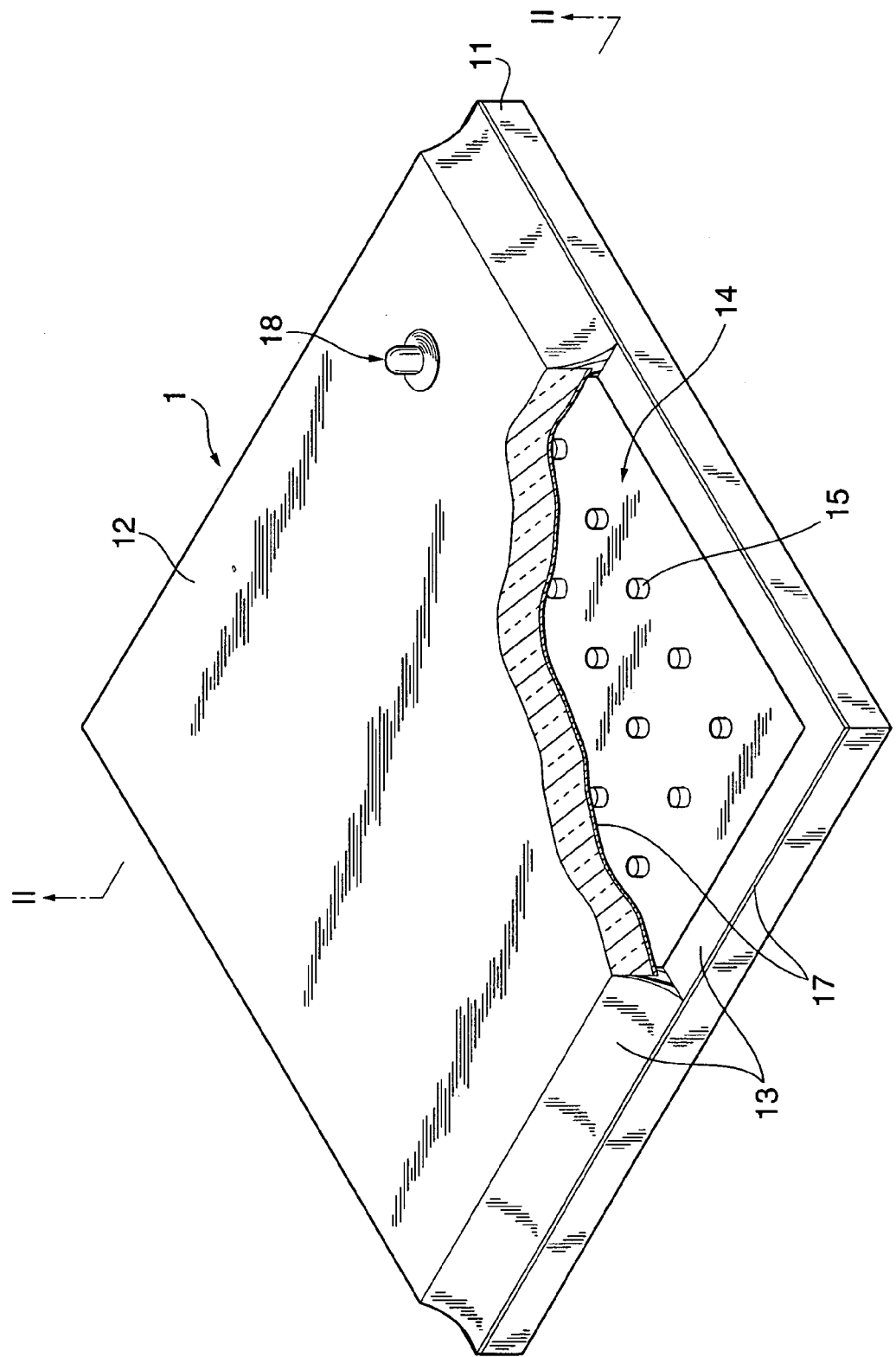
FIG. 1 is a perspective view of a light-transmitting glass panel according to an embodiment of the present invention.

FIG. 1 is a perspective view of a light-transmitting glass panel according to an embodiment of the present invention.

In FIG. 1, the light-transmitting glass panel 1 according to the embodiment of the present invention is comprised of a pair of glass plates 11 and 12 that are hermetically joined together with one surface (an inner surface) of each thereof facing one another, the joining being via a sealing frame 13 that is provided at an outer peripheral portion of the glass plates 11 and 12 and fluidizes at low temperature, and the glass plates 11 and 12 having a hollow layer 14 formed therebetween, and pillars 15 that are substantially cylindrical spacers that are inserted into the hollow layer 14 as atmospheric pressure supporting members and determine the gap between the glass plate 11 and the glass plate 12.

Figure 2:
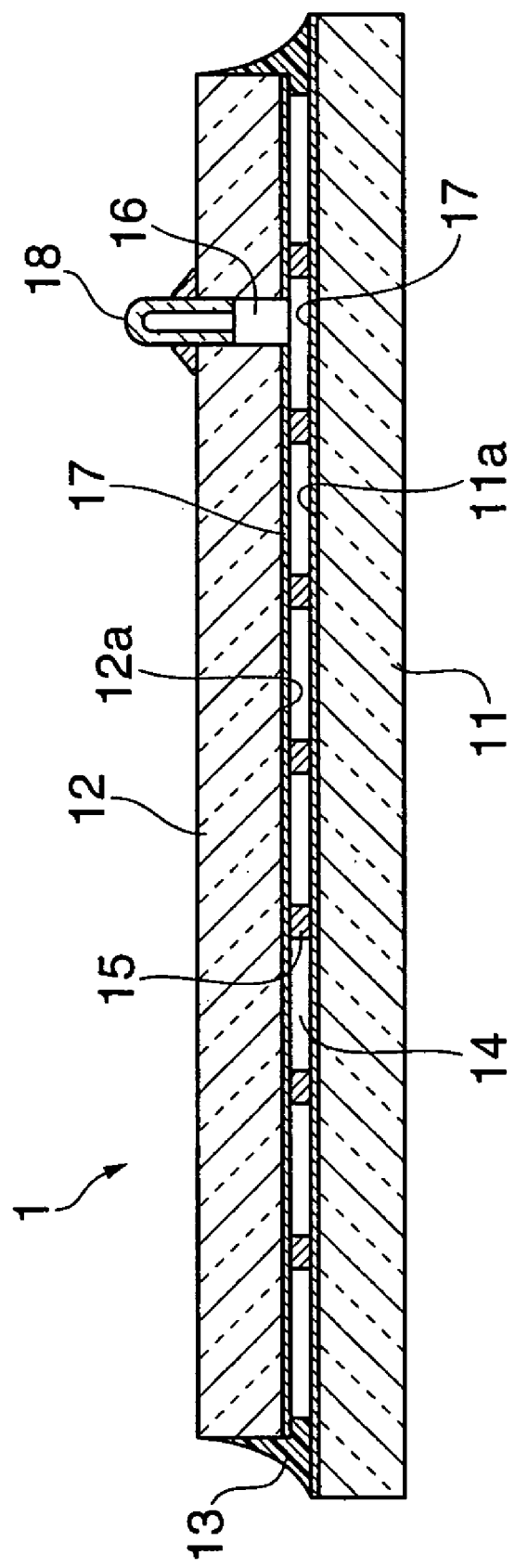
FIG. 2 is a sectional view taken along line II—II in FIG. 1.

FIG. 2 is a sectional view taken along line II—II in FIG. 1.

The glass plates 11 and 12 are each made of float plate glass, and each has a thickness set as appropriate between 2 and 8 mm, preferably between 2.5 and 6 mm. The glass plate 12 has formed therein a through hole 16 in a freely chosen position inside of a sealing surface with the sealing frame 13, so that the inside of the hollow layer 14 can be put into a reduced pressure state using a method described below, and a glass tube 18 is set in the through hole 16, and sites of contact therebetween are sealed using a predetermined method. Moreover, an end of the glass tube 18 on the atmospheric side is sealed using a predetermined method.

A low-emission coating layer 17 having an emittance of not more than 0.1 is coated by sputtering to obtain high thermal insulation performance on each of an inner surface 11a of the glass plate 11 and an inner surface 12a of the glass plate 12 that define the hollow layer 14.

Specifically, each low-emission coating layer 17 is obtained by forming an oxide layer of zinc oxide or the like as a first layer on each of the surface 11a of the glass plate 11 and the surface 12a of the glass plate 12, forming a second layer having silver as a principal component thereof on the first layer, forming a sacrificial layer for preventing oxidation of the silver as a third layer on the second layer, and forming an oxide layer of zinc oxide or the like as a fourth layer on the third layer. The thickness of the first layer is 10 to 50 nm, the thickness of the second layer is 5 to 20 nm, the thickness of the third layer is 1 to 5 nm, and the thickness of the fourth layer is 10 to 50 nm. Each low-emission coating layer 17 thus coated on will have an emittance of approximately 0.05 to 0.10, which is convenient for obtaining high thermal insulation performance. Note, that such a low-emission coating layer 17 may alternatively be coated onto only one of the surface 11a of the glass plate 11 and the surface 12a of the glass plate 12.

The hollow layer 14 is put into a reduced pressure state of not more than approximately 10 Pa, and the pillars 15 preferably have a sufficiently high compressive strength such as not to deform under the action of atmospheric pressure. This strength will depend on the area of the contact surface of each pillar 15 with each of the surface 11a of the glass plate 11 and the surface 12a of the glass plate 12 (hereinafter referred to as the "pillar contact surface"), but is preferably not less than 500 MPa. For example, if the strength of the pillars 15 is low, then the pillars 15 may deform through the atmospheric pressure acting on the glass plates 11 and 12, or break, whereby it will no longer be possible to form the hollow layer 14.

The pillars 15 are arranged in the hollow layer 14 in a matrix shape with a predetermined spacing, and are formed such as to have a height of approximately 0.2 mm and a pillar contact surface diameter of 0.5 mm. The pillars 15 are each formed in a cylindrical shape, whereby angular parts at which concentration of stress would be prone to occurring are not formed on the pillar contact surfaces with the glass plates 11 and 12, and hence the pillars 15 can support the glass plates 11 and 12 without being prone to breaking. Moreover, a peripheral portion of each pillar contact surface is rounded rather than sharp-pointed, and hence a concentrated load can be prevented from acting on the pillar contact surface.

The pillars 15 are arranged such that the average spacing D in mm of the pillars 15 arranged in the hollow layer 14 satisfies the relationship of undermentioned equation (1), where S represents the surface residual compressive stress of each of the glass plates 11 and 12 in MPa, and d represents the thickness of each of the glass plates 11 and 12 in mm.

$$D \leq 5.2d+5.5+(0.8d+0.08)\cdot\sqrt{S} \qquad (1)$$

Equation (1) has been derived from a large amount of data based on the examples described later; the upper limit of the average pitch D in equation (1) corresponds to the lines shown in FIGS. 4 to 7, described later. The value of the right side of equation (1) is a function of the thickness d of the glass plates 11 and 12 and the residual surface compressive stress S, and exhibits an approximately linear relationship with d, and a parabolic relationship with S. If the average spacing D of the pillars 15 is greater than the value of the right side of equation (1), then the tensile stress due to atmospheric pressure at the surface of each of the glass plates 11 and 12 on the opposite side to the surface against the pillar contact surfaces will become too high, and hence cracking will occur from this surface, and thus the probability of natural breakage of the glass plate 11 or 12 will become very high. On the other hand, if the average spacing D of the pillars 15 is much lower than the value of the right side of equation (1), then many pillars 15 will be visible from the outside, and hence the field of view will be impeded, and moreover there will be increased heat transfer through the pillars 15, and hence it will not be possible to obtain a good thermal insulation performance; 15 mm is thus preferably made to be a lower limit.

A description will now be given of a method of manufacturing the light-transmitting glass panel 1 of FIG. 1.

Float plate glass having a predetermined thickness is prepared, and then the float plate glass is cut to a predetermined size, thus manufacturing a glass plate 11, and a glass plate 12 that is cut smaller by predetermined dimensions than the glass plate 11. A through hole 16 is then formed in the glass plate 12.

Next, a dielectric layer made of a composite oxide comprised of ZnO with SnO$_2$ added thereto, a low-emission layer made of Ag, a sacrificial layer made of Ti, and a dielectric layer made of a composite oxide comprised of ZnO with SnO$_2$ added thereto are formed in this order by sputtering, thus coating a low-emission coating layer 17 having a normal emittance of 0.07 onto each of the surface 11a of the glass plate 11 and the surface 12a of the glass plate 12. Such a low-emission coating layer 17 may alternatively be coated onto only one of the glass plates 11 and 12. The glass plate 11 is then disposed horizontally such that the low-emission coating layer 17 is on top, and pillars 15 are arranged with a predetermined spacing on the glass plate 11. The glass plate 12 is then gently placed on the glass plate 11 with the pillars 15 therebetween such that the surface 12a contacts the pillar contact surface of each pillar 15. At this time, a weight is placed on the glass plate 12 so that the pillars 15 will not move during a step of forming a sealing frame 13.

With the weight thereon, the glass plates 11 and 12 that have been placed together as described above are placed on a hotplate, a heat insulating material is covered over from above, and while heating the glass plates 11 and 12 to 200° C., a gap portion at a periphery of the glass plates 11 and 12 is sealed with metal solder using an ultrasonic soldering iron (not shown in the drawings); once the sealing of the periphery has been completed, cooling is then carried out at a slow rate of approximately 1° C./min. The sealing frame 13 is thus formed. An Sn—Pb eutectic composition is used as the metal solder material. Moreover, at the same time as sealing the periphery of the glass plates 11 and 12, a prefabricated glass tube 18 is set into the through hole 16 in the glass plate 12, and sites of contact therebetween are similarly sealed using an ultrasonic soldering iron with metal solder having an Sn—Pb eutectic composition.

After the cooling has been completed, a vacuum pump is attached via a vacuum pump attachment jig to the glass tube 18 that has been set in the through hole 16, and the hollow layer 14 is evacuated using the vacuum pump while heating the whole of the glass plates 11 and 12 to 150° C., thus reducing the pressure inside the hollow layer 14 down to approximately 10 to 0.01 Pa, and then the glass tube 18 is sealed up, thus completing the manufacture of the light-transmitting glass panel 1.

In the embodiment of the present invention, a through hole 16 and a glass tube 18 are provided in the glass plate 12, and the hollow layer 14 is put into a reduced pressure state by evacuating through the glass tube 18 using a vacuum pump, but the method of putting the hollow layer 14 into a reduced pressure state is not limited to this; for example, instead of forming a through hole 16 and a glass tube 18 in the glass plate 12, the hollow layer 14 may be put into a reduced pressure state by manufacturing the light-transmitting glass panel 1 under a vacuum environment.

Figure 3:
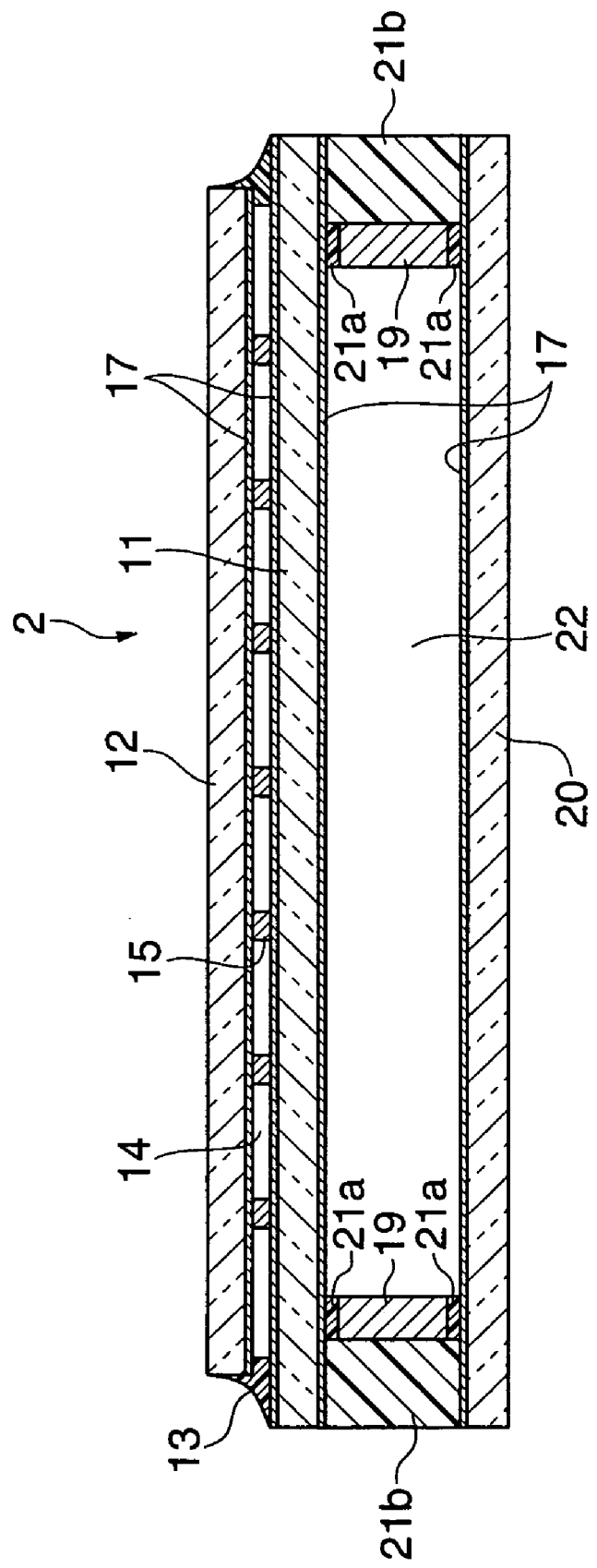
FIG. 3 is a sectional view of a light-transmitting glass panel according to another embodiment of the present invention.
Figure 4:
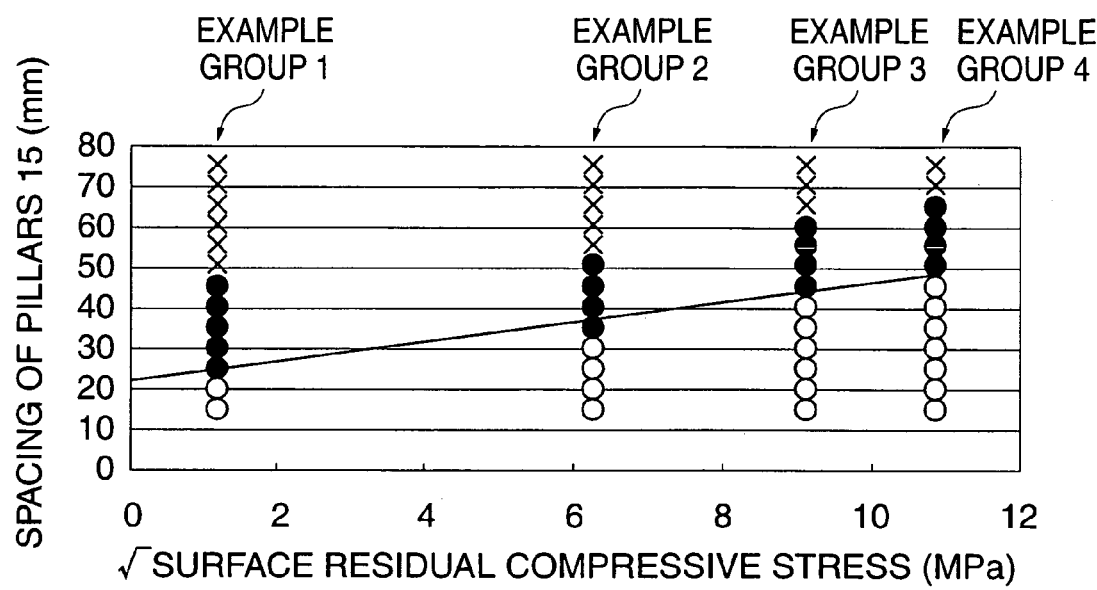
FIG. 4 is a graph showing the relationship between a glass plate surface residual compressive stress and a pillar pitch for Example Groups 1 to 4.
Figure 5:
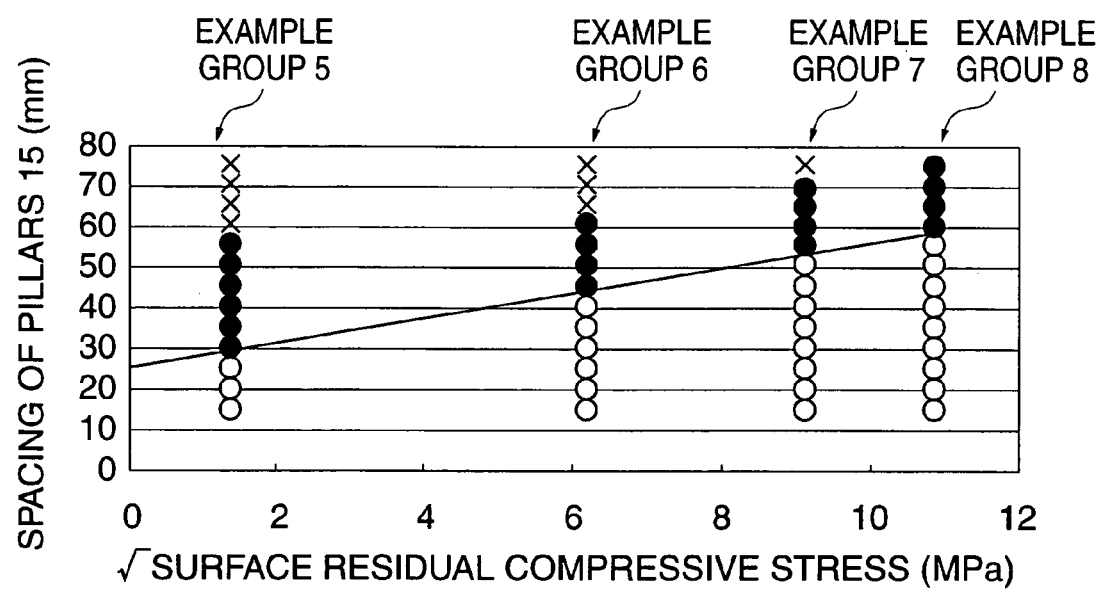
FIG. 5 is a graph showing the relationship between the glass plate surface residual compressive stress and the pillar pitch for Example Groups 5 to 8.
Figure 6:
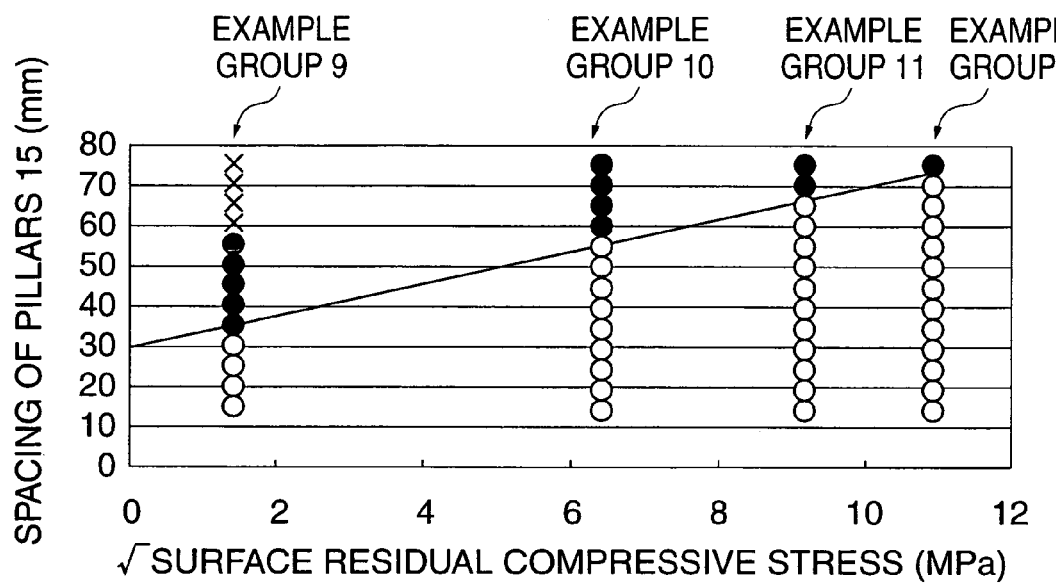
FIG. 6 is a graph showing the relationship between the glass plate surface residual compressive stress and the pillar pitch for Example Groups 9 to 12.
Figure 7:
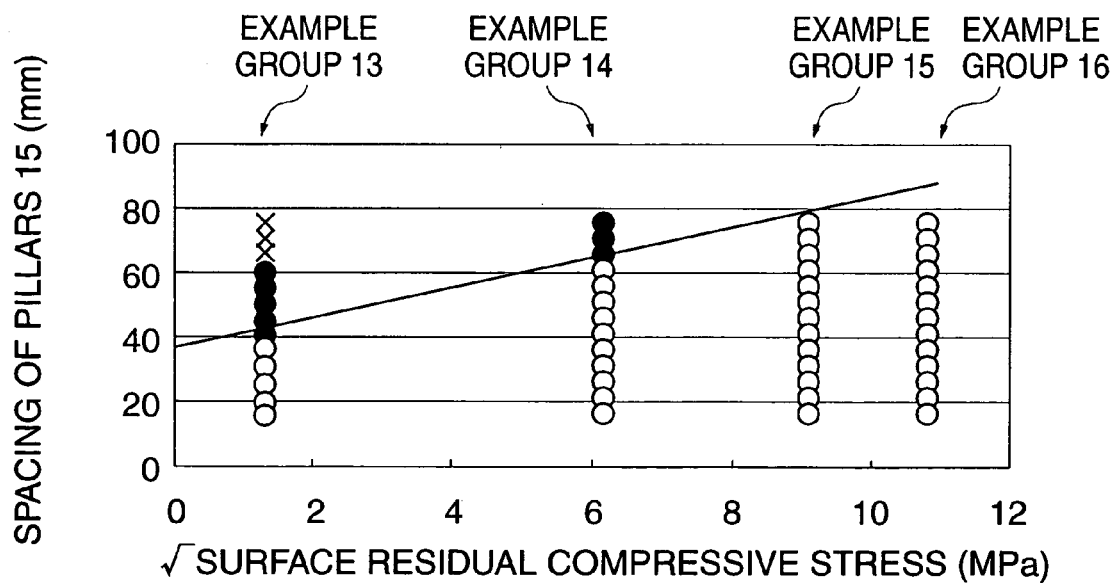
FIG. 7 is a graph showing the relationship between the glass plate surface residual compressive stress and the pillar pitch for Example Groups 13 to 16.

FIG. 3 is a sectional view of a light-transmitting glass panel according to another embodiment of the present invention.

In this other embodiment of the present invention, the construction is basically the same as in the embodiment described above, and hence component elements that are the same as in the embodiment described above are designated by the same reference numerals as in the embodiment described above, and redundant repeated description will be omitted; in the following, a description will be given of only the differences.

The light-transmitting glass panel 2 according to the other embodiment of the present invention is comprised of a pair of glass plates 11 and 12 that are hermetically joined together with one surface of each thereof facing one another, the joining being via a sealing frame 13 that is provided at an outer peripheral portion of the glass plates 11 and 12, and the glass plates 11 and 12 having a hollow layer 14 formed therebetween, substantially cylindrical pillars 15 that are inserted into the hollow layer 14 as atmospheric pressure supporting members and determine the gap between the glass plate 11 and the glass plate 12, and a glass plate 20 that is hermetically joined to the glass plate 11 by a bonding portion 21 at a peripheral portion of the glass plates 11 and 20 with the glass plate 20 facing an inner surface of the glass plate 11 on the opposite side to the surface 11a (i.e. another inner surface of the glass plate 11), the glass plates 11 and 20 having a predetermined gap therebetween through a spacer 19 provided therebetween near the peripheral portion thereof, and the glass plates 11 and 20 having an intermediate gas layer 22 (another hollow layer) formed therebetween. Unlike the hollow layer 14, the intermediate gas layer 22 is filled with dry air or a noble gas such as argon or krypton at a pressure close to atmospheric pressure.

Moreover, a low-emission coating layer 17 as in the light-transmitting glass panel 1 of FIG. 1 is coated onto each of the inner surface of the glass plate 11 and the inner surface of the glass plate 20 facing the intermediate gas layer 22. Note that such a low-emission coating layer 17 may alternatively be coated onto only one of the inner surface of the glass plate 11 and the inner surface of the glass plate 20.

The thickness of the intermediate gas layer 22, i.e. the gap between the glass plate 11 and the glass plate 20 is an important factor in determining the thermal insulation performance of the light-transmitting glass panel 2 as a whole, and is determined through the thickness of the spacer 19. This thickness will often be subjected to limitations according to the frame of the opening into which the light-transmitting glass panel 2 is to be installed, but from the viewpoint of increasing the thermal insulation performance, this thickness is preferably set to be within a range of 6 to 20 mm, more preferably 9 to 15 mm.

Aluminum is generally used for the spacer 19, this being for reasons such as the ease of processing and lightness thereof, but to further increase the thermal insulation performance, stainless steel or a thermoplastic or thermosetting resin having a low thermal conductivity may be used. Moreover, to keep the dew point inside low over a long time period, a desiccant such as a molecular sieve may be mixed in.

The bonding portion 21 is comprised of a primary sealant 21a and a secondary sealant 21b; the primary sealant 21a is formed between the spacer 19 and each of the glass plates 11 and 20, thus hermetically joining each of the glass plates 11 and 20 to the spacer 19, and the secondary sealant 21b is formed in a peripheral space that is on the outside of the spacer 19 and is surrounded by the glass plates 11 and 20, thus hermetically joining the glass plates 11 and 20 together. A polyisobutylene sealant, a butylene rubber sealant or the like can be used for the primary sealant 21a, and a polysulfide sealant, a silicone sealant, a polyurethane sealant or the like can be used for the secondary sealant 21b.

As a method of manufacturing the light-transmitting glass panel 2 of FIG. 3, first a light-transmitting glass panel 1 as shown in FIG. 1 is manufactured following the method of manufacturing the light-transmitting glass panel 1 described earlier, and then a frame-shaped spacer 19 is placed thereon near to a peripheral portion thereof via a primary sealant 21a, and the glass plate 20 is placed on the spacer 19 via another primary sealant 21a, and next the secondary sealant 21b is applied into the peripheral space that is on the outside of the spacer 19 and is surrounded by the glass plates 11 and 20, thus hermetically joining the glass plates 11 and 20 together. Dry air or a noble gas such as argon or krypton put in place of such dry air is filled into the intermediate gas layer 22. Moreover, a low-emission coating layer 17 as described earlier is coated onto the surface of each of the glass plates 11 and 20 facing the intermediate gas layer 22. Note that such a low-emission coating layer 17 may alternatively be coated onto only one of the surface of the glass plate 11 facing the intermediate gas layer 22 and the surface of the glass plate 20 facing the intermediate gas layer 22.

A description will now be given of examples of the light-transmitting glass panel 1 according to the embodiment of the present invention.

First, light-transmitting glass panels 1 were manufactured using the manufacturing method described earlier.

In each light-transmitting glass panel 1, the size of the glass plate 11 was made to be 200 mm×300 mm, and the size of the glass plate 12 was made to be 6 mm smaller than the size of the glass plate 11 for each of the length and width, i.e. 194 mm×294 mm. The cut out glass plates 11 and 12 were heated in a temperature range of from 600 to 700° C. in an electric furnace, and were then taken out and rapidly cooled by blowing on compressed air using a compressor, thus producing residual compressive stress at the surfaces of the glass plates 11 and 12 (hereinafter referred to as "surface residual compressive stress"). The surface residual compressive stress of the glass plates 11 and 12 was made to be any of various values by adjusting the heating temperature and the cooling air blowing pressure as appropriate. Next, a low-emission coating layer 17 as described earlier was coated onto the glass plate 12 only.

Moreover, the pillars 15 were made of Inconel 718, had a cylindrical shape with a height of 0.2 mm and a spacer contact surface diameter of 0.5 mm, and were arranged on the glass plate 11 with a spacing freely chosen from a range of 15 to 75 mm.

As the weight placed on the glass plates 11 and 12 that had been placed together as described above when placing the glass plates 11 and 12 on a hotplate and carrying out heat treatment, a rectangular parallelopiped-shaped stainless steel weight having a thickness of 5 mm and a cross-sectional shape with a length of 150 mm and a width of 200 mm was used.

Out of the light-transmitting glass panels 1 manufactured as described above, the following light-transmitting glass panels 1 were prepared: 13 types of light-transmitting glass panel 1 for which the thickness of the glass plates 11 and 12 was 3.0 mm, the surface residual compressive stress of the glass plates 11 and 12 was 1.5 MPa, and the spacing of the pillars 15 was set to a plurality of values that differ from one another by 5 mm, i.e. 15 mm, 20 mm, 25 mm, . . . 75 mm (Example Group 1), 13 types of light-transmitting glass panel 1 for which the thickness of the glass plates 11 and 12 was 3.0 mm, the surface residual compressive stress of the glass plates 11 and 12 was 39.3 MPa, and the spacing of the pillars 15 was set to a plurality of values that differ from one another by 5 mm, i.e. 15 mm, 20 mm, 25 mm, . . . 75 mm (Example Group 2), 13 types of light-transmitting glass panel 1 for which the thickness of the glass plates 11 and 12 was 3.0 mm, the surface residual compressive stress of the glass plates 11 and 12 was 83.0 MPa, and the spacing of the pillars 15 was set to a plurality of values that differ from one another by 5 mm, i.e. 15 mm, 20 mm, 25 mm, . . . 75 mm (Example Group 3), 13 types of light-transmitting glass panel 1 for which the thickness of the glass plates 11 and 12 was 3.0 mm, the surface residual compressive stress of the glass plates 11 and 12 was 117.5 MPa, and the spacing of the pillars 15 was set to a plurality of values that differ from one another by 5 mm, i.e. 15 mm, 20 mm, 25 mm, . . . 75 mm (Example Group 4), 13 types of light-transmitting glass panel 1 for which the thickness of the glass plates 11 and 12 was 3.8 mm, the surface residual compressive stress of the glass plates 11 and 12 was 2.0 MPa, and the spacing of the pillars 15 was set to a plurality of values that differ from one another by 5 mm, i.e. 15 mm, 20 mm, 25 mm, . . . 75 mm (Example Group 5), 13 types of light-transmitting glass panel 1 for which the thickness of the glass plates 11 and 12 was 3.8 mm, the surface residual compressive stress of the glass plates 11 and 12 was 38.5 MPa, and the spacing of the pillars 15 was set to a plurality of values that differ from one another by 5 mm, i.e. 15 mm, 20 mm, 25 mm, . . . 75 mm (Example Group 6), 13 types of light-transmitting glass panel 1 for which the thickness of the glass plates 11 and 12 was 3.8 mm, the surface residual compressive stress of the glass plates 11 and 12 was 82.5 MPa, and the spacing of the pillars 15 was set to a plurality of values that differ from one another by 5 mm, i.e. 15 mm, 20 mm, 25 mm, 75 mm (Example Group 7), 13 types of light-transmitting glass panel 1 for which the thickness of the glass plates 11 and 12 was 3.8 mm, the surface residual compressive stress of the glass plates 11 and 12 was 119.1 MPa, and the spacing of the pillars 15 was set to a plurality of values that differ from one another by 5 mm, i.e. 15 mm, 20 mm, 25 mm, . . . 75 mm (Example Group 8), 13 types of light-transmitting glass panel 1 for which the thickness of the glass plates 11 and 12 was 4.8 mm, the surface residual compressive stress of the glass plates 11 and 12 was 2.0 MPa, and the spacing of the pillars 15 was set to a plurality of values that differ from one another by 5 mm, i.e. 15 mm, 20 mm, 25 mm, 75 mm (Example Group 9), 13 types of light-transmitting glass panel 1 for which the thickness of the glass plates 11 and 12 was 4.8 mm, the surface residual compressive stress of the glass plates 11 and 12 was 41.0 MPa, and the spacing of the pillars 15 was set to a plurality of values that differ from one another by 5 mm, i.e. 15 mm, 20 mm, 25 mm, . . . 75 mm (Example Group 10), 13 types of light-transmitting glass panel 1 for which the thickness of the glass plates 11 and 12 was 4.8 mm, the surface residual compressive stress of the glass plates 11 and 12 was 84.4 MPa, and the spacing of the pillars 15 was set to a plurality of values that differ from one another by 5 mm, i.e. 15 mm, 20 mm, 25 mm, 75 mm (Example Group 11), 13 types of light-transmitting glass panel 1 for which the thickness of the glass plates 11 and 12 was 4.8 mm, the surface residual compressive stress of the glass plates 11 and 12 was 119.1 MPa, and the spacing of the pillars 15 was set to a plurality of values that differ from one another by 5 mm, i.e. 15 mm, 20 mm, 25 mm, 75 mm (Example Group 12), 13 types of light-transmitting glass panel 1 for which the thickness of the glass plates 11 and 12 was 5.8 mm, the surface residual compressive stress of the glass plates 11 and 12 was 1.6 MPa, and the spacing of the pillars 15 was set to a plurality of values that differ from one another by 5 mm, i.e. 15 mm, 20 mm, 25 mm, . . . 75 mm (Example Group 13), 13 types of light-transmitting glass panel 1 for which the thickness of the glass plates 11 and 12 was 5.8 mm, the surface residual compressive stress of the glass plates 11 and 12 was 37.3 MPa, and the spacing of the pillars 15 was set to a plurality of values that differ from one another by 5 mm, i.e. 15 mm, 20 mm, 25 mm, . . . 75 mm (Example Group 14), 13 types of light-transmitting glass panel 1 for which the thickness of the glass plates 11 and 12 was 5.8 mm, the surface residual compressive stress of the glass plates 11 and 12 was 82.3 MPa, and the spacing of the pillars 15 was set to a plurality of values that differ from one another by 5 mm, i.e. 15 mm, 20 mm, 25 mm, 75 mm (Example Group 15), and 13 types of light-transmitting glass panel 1 for which the thickness of the glass plates 11 and 12 was 5.8 mm, the surface residual compressive stress of the glass plates 11 and 12 was 116.1 MPa, and the spacing of the pillars 15 was set to a plurality of values that differ from one another by 5 mm, i.e. 15 mm, 20 mm, 25 mm, . . . 75 mm (Example Group 16).

Next, for each of the light-transmitting glass panels 1 (Example Groups 1 to 16), the stress generated at the surface on the atmospheric pressure side (the outer surface) of the glass plate 12 immediately above the spacer contact surface (hereinafter referred to as the "generated stress P") was measured using the following method. For the generated stress P, first a strain gauge was stuck to the outer surface of the glass plate 12 immediately above the spacer contact surface and the strain S1 was measured, and then the glass tube 18 for evacuating to a reduced pressure state was broken so as to put the inside of the hollow layer 14 into an atmospheric pressure state, and the strain S2 was again measured using the strain gauge; the difference S2−S1 between the measured strains S1 and S2 was then taken as the stress acting on the panel in the reduced pressure state immediately above the spacer. The results of the measurements are shown in FIGS. 4 to 7. In FIGS. 4 to 7, the axis of ordinate shows the spacing of the pillars 15, and the axis of abscissa shows the square root of the surface residual compressive stress of the glass plate 12; "○" indicates that the generated stress P was below an upper limit and hence the light-transmitting glass panel 1 was safe, "●" indicates that the generated stress P was above the upper limit, "x" indicates that the light-transmitting glass panel 1 broke during manufacture or the present evaluation, and the solid line indicates the upper limit. Here, the boundary between "●" and "○" was determined empirically as follows.

First, it was discovered empirically that the value of the generated stress P measured as described above depends on the thickness of the glass plate 12 and the spacing of the pillars 15, but does not depend on the surface residual compressive stress of the glass plate 12, being constant within a range of approximately ±1 MPa, and hence averaging of the generated stress P data was carried out over glass plates 12 having the same glass plate thickness and the same spacer spacing (but different surface residual compressive stresses). The results are shown in Table 1.

TABLE 1

| EXAMPLE | THICKNESS OF GLASS PLATE 12 (mm) | GENERATED STRESS P (AVERAGE) (MPa) SPACING OF PILLARS 15 (mm) | | | | | | | | | | | | |
|---|---|---|---|---|---|---|---|---|---|---|---|---|---|---|
| | | 15 | 20 | 25 | 30 | 35 | 40 | 45 | 50 | 55 | 60 | 65 | 70 | 75 |
| GROUPS 1–4 | 3.0 | 2.3 | 4.7 | 8.5 | 12.7 | 18.1 | 24.4 | 31.1 | 39.3 | 48.6 | 58.5 | 69.0 | 81.3 | 93.5 |

TABLE 1-continued

| EXAMPLE | THICKNESS OF GLASS PLATE 12 (mm) | GENERATED STRESS P (AVERAGE) (MPa) SPACING OF PILLARS 15 (mm) | | | | | | | | | | | |
|---|---|---|---|---|---|---|---|---|---|---|---|---|---|
| | | 15 | 20 | 25 | 30 | 35 | 40 | 45 | 50 | 55 | 60 | 65 | 70 | 75 |
| GROUPS 5–8 | 3.8 | 1.4 | 3.2 | 5.0 | 7.9 | 11.5 | 15.0 | 19.8 | 24.4 | 30.6 | 36.1 | 42.9 | 50.4 | 58.6 |
| GROUPS 9–12 | 4.8 | 1.0 | 1.7 | 3.3 | 5.2 | 7.1 | 9.4 | 12.1 | 15.1 | 19.3 | 22.7 | 26.6 | 31.4 | 36.6 |
| GROUPS 13–16 | 5.8 | 0.7 | 1.2 | 2.3 | 3.8 | 4.6 | 6.4 | 8.6 | 10.9 | 12.7 | 15.8 | 18.8 | 21.9 | 24.8 |

Next, out of the light-transmitting glass panels 1 manufactured as described above, the following glass plates 12 were prepared: glass plates 12 having a surface residual compressive stress of approximately 2 MPa and a thickness of 3.0 mm, 3.8 mm, 4.8 mm or 5.8 mm (Example Group 17), glass plates 12 having a surface residual compressive stress of approximately 39 MPa and a thickness of 3.0 mm, 3.8 mm, 4.8 mm or 5.8 mm (Example Group 18), glass plates 12 having a surface residual compressive stress of approximately 83 MPa and a thickness of 3.0 mm, 3.8 mm, 4.8 mm or 5.8 mm (Example Group 19), and glass plates 12 having a surface residual compressive stress of approximately 118 MPa and a thickness of 3.0 mm, 3.8 mm, 4.8 mm or 5.8 mm (Example Group 20) were prepared.

Next, for each of these glass plates 12 (Example Groups 17 to 20), a ring flexural failure test was carried out, Weibull statistical processing was carried out, and the tensile strength (the tensile stress at a failure probability of 1/1000) was measured. The results are shown in Table 2.

TABLE 2

| | | SURFACE RESIDUAL COMPRESSIVE STRESS (MPa) | TENSILE STRENGTH (MPa) THICKNESS (GLASS PLATE 2) (mm) | | | |
|---|---|---|---|---|---|---|
| | | | 3 | 3.8 | 4.8 | 5.8 |
| EXAMPLE | GROUP 17 | 2 | 5.5 | 5.5 | 5.5 | 5.5 |
| | GROUP 18 | 39 | 17.7 | 17.7 | 17.7 | 17.7 |
| | GROUP 19 | 83 | 27.4 | 27.4 | 27.4 | 27.4 |
| | GROUP 20 | 118 | 31.5 | 31.5 | 31.5 | 31.5 |

From FIG. 2, it can be seen that the tensile strength depends only on the surface residual compressive stress, and does not depend on the thickness of the glass plate 12.

By comparing Tables 1 and 2, it can be seen that the region considered to be safe for the spacing of the pillars 15 is given by the function of the thickness of the glass plate 12 and the surface residual compressive stress of the glass plate 12 represented by the solid lines in FIGS. 4 to 7.

What is described above for the glass plate 12 in the examples for the embodiment of the present invention applies similarly to the glass plate 11.

Next, out of the light-transmitting glass panels 1 manufactured as described above, the following light-transmitting glass panels 1 were prepared: a light-transmitting glass panel 1 for which the surface residual compressive stress of the glass plate 12 was 39.3 MPa, the thickness of the glass plate 12 was 3.0 mm, and the spacing of the pillars 15 was 30 mm (Example 1), a light-transmitting glass panel 1 for which the surface residual compressive stress of the glass plate 12 was 2.0 MPa, the thickness of the glass plate 12 was 4.8 mm, and the spacing of the pillars 15 was 30 mm (Example 2), a light-transmitting glass panel 1 for which the surface residual compressive stress of the glass plate 12 was 38.5 MPa, the thickness of the glass plate 12 was 3.8 mm, and the spacing of the pillars 15 was 40 mm (Example 3), a light-transmitting glass panel 1 for which the surface residual compressive stress of the glass plate 12 was 82.5 MPa, the thickness of the glass plate 12 was 3.8 mm, and the spacing of the pillars 15 was 50 mm (Example 4), a light-transmitting glass panel 1 for which the surface residual compressive stress of the glass plate 12 was 41.0 MPa, the thickness of the glass plate 12 was 4.8 mm, and the spacing of the pillars 15 was 50 mm (Example 5), a light-transmitting glass panel 1 for which the surface residual compressive stress of the glass plate 12 was 84.4 MPa, the thickness of the glass plate 12 was 4.8 mm, and the spacing of the pillars 15 was 60 mm (Example 6), and a light-transmitting glass panel 1 for which the surface residual compressive stress of the glass plate 12 was 2.0 MPa, the thickness of the glass plate 12 was 3.0 mm, and the spacing of the pillars 15 was 20 mm (Comparative Example 1).

For Examples 1 to 6 and Comparative Example 1, thermal insulation performance (thermal conductance) measurements were carried out using a thermal insulation performance tester (an HC-074 thermal conductivity tester made by Eko Instruments Co., Ltd.). The results are shown in Table 3.

TABLE 3

| | THICKNESS OF GLASS PLATE 12 (d) (mm) | SURFACE RESIDUAL COMPRESSIVE STRESS (S) (MPa) | 5.2 d + 5.5 + (0.8 d + 0.08 · $\sqrt{S}$ | SPACING OF PILLARS 15 (D) (mm) | THERMAL CONDUCTANCE (W/m²K) |
|---|---|---|---|---|---|
| COMPARATIVE EXAMPLE 1 | 3.0 | 2.0 | 24.6 | 30 | 1.35 |
| EXAMPLE 1 | 3.0 | 39.3 | 36.6 | 30 | 0.59 |
| EXAMPLE 2 | 4.8 | 2.0 | 36.0 | 30 | 0.57 |
| EXAMPLE 3 | 3.8 | 38.5 | 44.6 | 40 | 0.59 |
| EXAMPLE 4 | 3.8 | 82.5 | 53.6 | 50 | 0.57 |
| EXAMPLE 5 | 4.8 | 41.0 | 55.6 | 50 | 0.58 |
| EXAMPLE 6 | 4.8 | 84.4 | 66.5 | 60 | 0.53 |

From Table 3, it can be seen that whereas the thermal conductance for Comparative Example 1 is unsatisfactory at 1.35 W/m²K, the thermal conductance for Examples 1 to 6 is less than 0.6 W/m²K, indicating excellent thermal insulation performance. Moreover, here, it can be seen that the thermal conductance hardly depends on the thickness of the glass plate 12, and that the dependence on the spacing of the pillars 15 is dominant.

Examples will now be given of the light-transmitting glass panel 2 according to the other embodiment of the present invention.

First, light-transmitting glass panels 2 were manufactured using the manufacturing method described earlier.

In each light-transmitting glass panel 2, the size of the glass plate 11 was made to be 350 mm×500 mm, and the size of the glass plate 12 was made to be 6 mm smaller than the size of the glass plate 11 for each of the length and width, i.e. 344 mm×494 mm. The cut out glass plates 11 and 12 were heated in a temperature range of from 600 to 700° C. in an electric furnace, and were then taken out and rapidly cooled by blowing on compressed air using a compressor, thus producing a surface residual compressive stress of 82.5 MPa on the glass plates 11 and 12. Next, a low-emission coating layer 17 as described earlier was coated onto the glass plate 12 only. The height of the pillars 15, i.e. the thickness of the hollow layer 14, was made to be 0.2 mm. A frame-shaped aluminum spacer 19 that contained a molecular sieve and had an adhesive polyisobutylene primary sealant 21a applied onto surfaces thereof that were to contact the glass plates 11 and 20 was placed on the glass panel, and then the glass plate 20 was placed thereon. The size of the glass plate 20 was made to be the same as that of the glass plate 11. A polysulfide secondary sealant 21b was further applied into a peripheral space on the outside of the aluminum frame-shaped spacer 19 and surrounded by the glass plates 11 and 20, and was then cured. The distance between the glass plate 20 and the glass panel, i.e. the gap between the glass plate 11 and the glass plate 20, which is determined by the height of the aluminum frame-shaped spacer 19, was made to be 12 mm. Moreover, the intermediate gas layer 22 having this thickness of 12 mm was filled with dry air, but in some cases this dry air may be replaced with a gas as described below. A low-emission coating layer 17 as described earlier was provided on the inner surface of the glass plate 20.

Out of the light-transmitting glass panels 2 manufactured as described above, the following light-transmitting glass panels were prepared: a light-transmitting glass panel 2 for which the thickness of the glass plate 12 was 3.0 mm, the spacing of the pillars 15 was 30 mm, and the gas filled into the intermediate gas layer 22 was dry air (Example 7), a light-transmitting glass panel 2 for which the thickness of the glass plate 12 was 3.0 mm, the spacing of the pillars 15 was 30 mm, and the gas filled into the intermediate gas layer 22 was argon (Example 8), a light-transmitting glass panel 2 for which the thickness of the glass plate 12 was 3.0 mm, the spacing of the pillars 15 was 30 mm, and the gas filled into the intermediate gas layer 22 was krypton (Example 9), a light-transmitting glass panel 2 for which the thickness of the glass plate 12 was 3.8 mm, the spacing of the pillars 15 was 50 mm, and the gas filled into the intermediate gas layer 22 was dry air (Example 10), a light-transmitting glass panel 2 for which the thickness of the glass plate 12 was 3.8 mm, the spacing of the pillars 15 was 50 mm, and the gas filled into the intermediate gas layer 22 was argon (Example 11), and a light-transmitting glass panel 2 for which the thickness of the glass plate 12 was 3.8 mm, the spacing of the pillars 15 was 50 mm, and the gas filled into the intermediate gas layer 22 was krypton (Example 12) were prepared. Moreover, a light-transmitting glass panel 1 for which the thickness of the glass plate 12 was 3.0 mm, the spacing of the pillars 15 was 30 mm, and the rest of the construction was as for Examples 7 to 12 (Comparative Example 2), and a light-transmitting glass panel 1 for which the thickness of the glass plate 12 was 3.8 mm, the spacing of the pillars 15 was 50 mm, and the rest of the construction was as for Examples 7 to 12 (Comparative Example 3).

Next, each of the light-transmitting glass panels 2 of Examples 7 to 12 and the light-transmitting glass panels 1 of Comparative Examples 2 and 3 was disposed at a partition in a temperature-adjusted chamber having two compartments therein with the partition therebetween, the temperature in one compartment being 0° C. and the temperature in the other compartment being 20° C., and a heat flux measuring device was stuck onto the light-transmitting glass panel 2 and the thermal conductance was measured. The results are shown in Table 4.

TABLE 4

|  | GAS FILLED INTO INTERMEDIATE GAS LAYER 22 | THICKNESS OF GLASS PLATE 12 (d) (mm) | SURFACE RESIDUAL COMPRESSIVE STRESS (S) (MPa) | $5.2 d + 5.5 + (0.8 d + 0.08) \cdot \sqrt{S}$ | SPACING OF PILLARS 15 (D) (mm) | THERMAL CONDUCTANCE (W/m²K) |
|---|---|---|---|---|---|---|
| COMPARATIVE EXAMPLE 2 | — | 3.0 | 82.5 | 43.6 | 30 | 0.59 |
| EXAMPLE 7 | DRY AIR | 3.0 | 82.5 | 43.6 | 30 | 0.56 |
| EXAMPLE 8 | ARGON | 3.0 | 82.5 | 43.6 | 30 | 0.54 |
| EXAMPLE 9 | KRYPTON | 3.0 | 82.5 | 43.6 | 30 | 0.53 |
| COMPARATIVE EXAMPLE 3 | — | 3.8 | 82.5 | 53.6 | 50 | 0.53 |
| EXAMPLE 10 | DRY AIR | 3.8 | 82.5 | 53.6 | 50 | 0.46 |
| EXAMPLE 11 | ARGON | 3.8 | 82.5 | 53.6 | 50 | 0.42 |
| EXAMPLE 12 | KRYPTON | 3.8 | 82.5 | 53.6 | 50 | 0.40 |

From Table 4, it can be seen that a light-transmitting glass panel 2 having thermal conductance below 0.6 W/m²K can easily be obtained.

What is described above for the glass plate 12 in the examples for the other embodiment of the present invention applies similarly to the glass plate 11.

Moreover, in the examples for the embodiment and the other embodiment of the present invention described above, the glass plates 11 and 12 were manufactured so as to have different sizes to one another; however, there is no limitation to such a construction, but rather the glass plates 11 and 12 may be made to have the same size as one another, being disposed such that edges thereof are substantially aligned.

In the above embodiments, the glass plates 11 and 12 were made to have the same thickness as one another; however, there is no limitation thereto, but rather the glass plates 11 and 12 may have different thicknesses to one another. In this case, when considering equation (1), the thickness of the glass plates 11 and 12 should be read instead as the thickness of the thinner one of the two glass plates 11 and 12. Moreover, in the above embodiments, the type of the glass plates 11 and 12 has been made to be float plate glass; however, there is no limitation thereto, but rather the type of the glass plates 11 and 12 may be set as appropriate. For example, plate glass that has been given any of various functions such as figured glass, frosted glass (glass that has been had a function of diffusing light added thereto through surface treatment), wire-reinforced glass, heat-absorbing glass, ultraviolet-absorbing glass, or heat-reflecting glass, or a combination therewith may be used.

Moreover, the composition of the glass may be soda-silicate glass, borosilicate glass, aluminosilicate glass, or any of various types of crystallized glass.

The pillars 15 are not limited to being made of Inconel 718, but rather may be made of, for example, stainless steel or another metal, or quartz glass, a ceramic, a low-melting glass or the like, i.e. the pillars 15 should be made of something that is not prone to deforming such that the glass plates 11 and 12 contact one another upon being subjected to external force.

The sealing frame 13 that seals the glass plates 11 and 12 together is not limited to being formed using a Pb—Sn eutectic solder, but rather may be formed using, for example, a metallic material having as a principal component thereof one or a plurality of tin, bismuth, zinc, indium, antimony and so on. More specifically, an Sn—Ag, Sn—Zn—Bi, Sn—Zn—Ti solder or the like may be used. Moreover, a material that melts and fuses at a temperature sufficiently low as not to cause thermal relaxation of the surface compressive stress that has been formed in advance (i.e. not more than approximately 380° C.) is suitable, for example a low-melting glass or a thermoplastic resin may be used.

INDUSTRIAL APPLICABILITY

As described in detail above, according to the light-transmitting glass panel of the present invention, a low-emission layer having a low emittance of not more than 0.1 is provided on an inner surface of at least one of a pair of glass plates, pillars are sandwiched between the pair of glass plates in a matrix shape and arranged at a predetermined pitch D, a hollow layer has a pressure therein of not more than 10 Pa, and the thickness d in mm and the surface residual compressive stress S in MPa of the pair of glass plates, and the pitch D of the pillars satisfy $D \leq f(d,\sqrt{S})$; as a result, a light-transmitting glass panel having photothermal performance with a thermal conductance of not more than 0.6 W/m$^2$K can be provided.

According to a preferred form of the glass panel of the present invention, $f(d,\sqrt{S})$ is defined as $f(d,\sqrt{S}) = 5.2d+5.5+(0.8d+0.08)\cdot\sqrt{S}$; as a result, the above effect can be achieved reliably.

According to a more preferred form of the glass panel of the present invention, a second glass plate is provided with a spacer hermetically sandwiched between this second glass plate and one of the pair of glass plates, thus forming a second hollow layer, a second low-emission layer having an emittance of not more than 0.2 is provided on at least one of a second inner surface of the one of the pair of glass plates and an inner surface of the second glass plate, and the second hollow layer is filled with a predetermined gas; as a result, the thermal conductance of the light-transmitting glass panel can easily be made to be not more than 0.6 W/m$^2$K.

What is claimed is:

1. A light-transmitting glass panel comprising a pair of glass plates provided separated from one another by a predetermined gap so as to form a hollow layer, and an outer periphery sealing portion that is provided at a peripheral portion of said pair of glass plates and hermetically seals in said hollow layer, characterized in that:

the light-transmitting glass panel has a low-emission layer that is provided on an inner surface of at least one of said pair of glass plates and has an emittance of not more than 0.1, and pillars that are sandwiched between said pair of glass plates in a matrix shape and arranged at a predetermined pitch so as to maintain the predetermined gap; and said hollow layer has a pressure therein of not more than 10 Pa, and a thickness d in mm of said pair of glass plates, a surface residual compressive stress S in MPa of said pair of glass plates, and the predetermined pitch D of said pillars satisfy $D \leq f(d,\sqrt{S})$.

2. A light-transmitting glass panel as claimed in claim 1, characterized in that $f(d,\sqrt{S})$ is defined as $f(d,\sqrt{S}) = 5.2d+5.5+(0.8d+0.08)\cdot\sqrt{S}$.

3. A light-transmitting glass panel as claimed in claim 1 or 2, characterized in that the thickness d of said pair of glass plates is in a range of 2 to 8 mm, and the surface residual compressive stress S of said pair of glass plates is in a range of 1 to 200 MPa.

4. A light-transmitting glass panel as claimed in claim 3, characterized in that said pair of glass plates have a Young's modulus in a range of 70 to 75 GPa.

5. A light-transmitting glass panel as claimed in claim 4, characterized by further having a second glass plate provided separated from one of said pair of glass plates by a second predetermined gap so as to form a second hollow layer, a spacer that is hermetically sandwiched between said one of said pair of glass plates and said second glass plate so as to maintain the second predetermined gap, and a second low-emission layer that is provided on at least one of a second inner surface of said one of said pair of glass plates and an inner surface of said second glass plate and has an emittance of not more than 0.2, wherein said second hollow-layer is filled with a predetermined gas.

6. A light-transmitting glass panel as claimed in claim 5, characterized in that the predetermined gas is dry air.

7. A light-transmitting glass panel as claimed in claim 5, characterized in that the predetermined gas is a noble gas.

8. A light-transmitting glass panel as claimed in claim 7, characterized in that the noble gas is argon.

9. A light-transmitting glass panel as claimed in claim 7, characterized in that the noble gas is krypton.

10. A light-transmitting glass panel as claimed in claim 3, characterized by further having a second glass plate provided separated from one of said pair of glass plates by a second predetermined gap so as to form a second hollow layer, a spacer that is hermetically sandwiched between said one of said pair of glass plates and said second glass plate so as to maintain the second predetermined gap, and a second low-emission layer that is provided on at least one of a second inner surface of said one of said pair of glass plates and an inner surface of said second glass plate and has an emittance of not more than 0.2, wherein said second hollow layer is filled with a predetermined gas.

11. A light-transmitting glass panel as claimed in claim 10, characterized in that the predetermined gas is dry air.

12. A light-transmitting glass panel as claimed in claim 10, characterized in that the predetermined gas is a noble gas.

13. A light-transmitting glass panel as claimed in claim 12, characterized in that the noble gas is argon.

14. A light-transmitting glass panel as claimed in claim 12, characterized in that the noble gas is krypton.

15. A light-transmitting glass panel as claimed in claim 1 or 2, characterized in that the thickness d of said pair of glass plates is in a range of 2.5 to 6 mm, and the predetermined pitch of said pillars is not less than 15 mm.

16. A light-transmitting glass panel as claimed in claim 15, characterized in that said pair of glass plates have a Young's modulus in a range of 70 to 75 GPa.

17. A light-transmitting glass panel as claimed in claim 16, characterized by further having a second glass plate provided separated from one of said pair of glass plates by a second predetermined gap so as to form a second hollow layer, a spacer that is hermetically sandwiched between said one of said pair of glass plates and said second glass plate so as to maintain the second predetermined gap, and a second low-emission layer that is provided on at least one of a second inner surface of said one of said pair of glass plates and an inner surface of said second glass plate and has an emittance of not more than 0.2, wherein said second hollow layer is filled with a predetermined gas.

18. A light-transmitting glass panel as claimed in claim 17, characterized in that the predetermined gas is dry air.

19. A light-transmitting glass panel as claimed in claim 17, characterized in that the predetermined gas is a noble gas.

20. A light-transmitting glass panel as claimed in claim 19, characterized in that the noble gas is argon.

21. A light-transmitting glass panel as claimed in claim 19, characterized in that the noble gas is krypton.

22. A light-transmitting glass panel as claimed in claim 15, characterized by further having a second glass plate provided separated from one of said pair of glass plates by a second predetermined gap so as to form a second hollow layer, a spacer that is hermetically sandwiched between said one of said pair of glass plates and said second glass plate so as to maintain the second predetermined gap, and a second low-emission layer that is provided on at least one of a second inner surface of said one of said pair of glass plates and an inner surface of said second glass plate and has an emittance of not more than 0.2, wherein said second hollow layer is filled with a predetermined gas.

23. A light-transmitting glass panel as claimed in claim 22, characterized in that the predetermined gas is dry air.

24. A light-transmitting glass panel as claimed in claim 22, characterized in that the predetermined gas is a noble gas.

25. A light-transmitting glass panel as claimed in claim 24, characterized in that the noble gas is argon.

26. A light-transmitting glass panel as claimed in claim 24, characterized in that the noble gas is krypton.

27. A light-transmitting glass panel as claimed in claims 1 or 2, characterized in that said pair of glass plates have a Young's modulus in a range of 70 to 75 GPa.

28. A light-transmitting glass panel as claimed in claim 27, characterized by further having a second glass plate provided separated from one of said pair of glass plates by a second predetermined gap so as to form a second hollow layer, a spacer that is hermetically sandwiched between said one of said pair of glass plates and said second glass plate so as to maintain the second predetermined gap, and a second low-emission layer that is provided on at least one of a second inner surface of said one of said pair of glass plates and an inner surface of said second glass plate and has an emittance of not more than 0.2, wherein said second hollow layer is filled with a predetermined gas.

29. A light-transmitting glass panel as claimed in claim 28, characterized in that the predetermined gas is dry air.

30. A light-transmitting glass panel as claimed in claim 28, characterized in that the predetermined gas is a noble gas.

31. A light-transmitting glass panel as claimed in claim 30, characterized in that the noble gas is argon.

32. A light-transmitting glass panel as claimed in claim 30, characterized in that the noble gas is krypton.

33. A light-transmitting glass panel as claimed in claims 1 or 2, characterized by further having a second glass plate provided separated from one of said pair of glass plates by a second predetermined gap so as to form a second hollow layer, a spacer that is hermetically sandwiched between said one of said pair of glass plates and said second glass plate so as to maintain the second predetermined gap, and a second low-emission layer that is provided on at least one of a second inner surface of said one of said pair of glass plates and an inner surface of said second glass plate and has an emittance of not more than 0.2, wherein said second hollow layer is filled with a predetermined gas.

34. A light-transmitting glass panel as claimed in claim 33, characterized in that the predetermined gas is dry air.

35. A light-transmitting glass panel as claimed in claim 33, characterized in that the predetermined gas is a noble gas.

36. A light-transmitting glass panel as claimed in claim 35, characterized in that the noble gas is argon.

37. A light-transmitting glass panel as claimed in claim 35, characterized in that the noble gas is krypton.

* * * * *